(12) United States Patent
You et al.

(10) Patent No.: US 10,826,095 B2
(45) Date of Patent: Nov. 3, 2020

(54) AIR SUPPLY CONTROL METHOD AND SYSTEM FOR FUEL CELL

(71) Applicants: HYUNDAI MOTOR COMPANY, Seoul (KR); KIA MOTORS CORPORATION, Seoul (KR)

(72) Inventors: Chang Seok You, Anyang-si (KR); Min Su Kang, Paju-si (KR); Sung Do Kim, Seongnam-si (KR); Dong Hun Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 15/821,458

(22) Filed: Nov. 22, 2017

(65) Prior Publication Data

US 2018/0269506 A1    Sep. 20, 2018

(30) Foreign Application Priority Data

Mar. 17, 2017    (KR) .................... 10-2017-0033998

(51) Int. Cl.

| | |
|---|---|
| *H01M 8/04992* | (2016.01) |
| *H01M 8/04313* | (2016.01) |
| *H02P 23/02* | (2006.01) |
| *H01M 8/04828* | (2016.01) |
| *B60L 58/30* | (2019.01) |
| *H01M 8/0438* | (2016.01) |
| *B60L 1/00* | (2006.01) |

(52) U.S. Cl.
CPC ......... *H01M 8/04992* (2013.01); *B60L 1/003* (2013.01); *B60L 58/30* (2019.02); *H01M 8/04313* (2013.01); *H01M 8/04395* (2013.01); *H01M 8/04947* (2013.01); *H02P 23/02* (2013.01)

(58) Field of Classification Search
None
See application file for complete search history.

(56) References Cited

U.S. PATENT DOCUMENTS

| | | | | |
|---|---|---|---|---|
| 9,225,280 B2 * | 12/2015 | Okamura | ............. | B60L 15/025 |
| 9,368,850 B2 * | 6/2016 | Yoshida | ................. | B60L 58/34 |
| 9,972,853 B2 * | 5/2018 | Kang | ................. | H01M 8/04111 |
| 10,158,134 B2 * | 12/2018 | Matsusue | ......... | H01M 8/04828 |
| 10,291,054 B2 * | 5/2019 | Watanabe | ............. | H02J 7/0054 |

(Continued)

FOREIGN PATENT DOCUMENTS

| | | |
|---|---|---|
| JP | 4798075 B2 | 10/2011 |
| JP | 4978429 B2 | 7/2012 |

(Continued)

*Primary Examiner* — Tracy M Dove
(74) *Attorney, Agent, or Firm* — Morgan, Lewis & Bockius LLP

(57) ABSTRACT

An air supply control method and system for a fuel cell controlling a switching frequency of an inverter at which power consumption of the air compressor becomes minimal includes: calculating a revolution per minute (RPM) of a motor of an air compressor; calculating a switching frequency of an inverter of the motor of the air compressor at which power consumption becomes minimal based on the calculated RPM of the motor; and controlling the inverter with the calculated switching frequency.

6 Claims, 2 Drawing Sheets

(56) References Cited

U.S. PATENT DOCUMENTS

2006/0014063 A1* 1/2006 Kokubo ............ H01M 8/04089
                                                       429/431
2018/0223832 A1* 8/2018 Ren ....................... F04B 49/065
2018/0291901 A1* 10/2018 Yabe ...................... F04B 27/08

FOREIGN PATENT DOCUMENTS

| JP | 2016-005349 A | 1/2016 | |
|----|----|----|----|
| KR | 10-2004-0000725 A | 1/2004 | |
| KR | 10-1411542 B1 | 6/2014 | |
| KR | 10-1655602 B1 | 9/2016 | |
| WO | WO-2016098186 A1 * | 6/2016 | ............ F04B 49/065 |

* cited by examiner

AIR SUPPLY CONTROL METHOD AND SYSTEM FOR FUEL CELL

CROSS REFERENCE TO RELATED APPLICATION

The present application is based on and claims the benefit of priority to Korean Patent Application No. 10-2017-0033998, filed on Mar. 17, 2017, the entire contents of which is incorporated herein for all purposes by this reference.

TECHNICAL FIELD

The present disclosure relates to an air supply control method and system for a fuel cell capable of improving efficiency of the air supply system for a fuel cell by suggesting a switching frequency at which power consumption of an inverter connected to a motor of an air compressor is minimized, in a low output section of the fuel cell.

BACKGROUND

A fuel cell is a kind of generator that converts chemical energy into electrical energy by an electrochemical reaction in a fuel cell stack without converting the chemical energy of fuel into heat by combustion, and may be used to supply electric power to small electric/electronic products, in particular, portable apparatuses as well as to supply electric power for industries, electric power for a home, and electric power for driving a vehicle.

In particular, a technology in which a pressurized system using an air compressor is applied to meet performance of a fuel cell system under a high temperature condition has been already known.

However, accessories of the fuel cell consume relatively more power in the low power operation section of the fuel cell system during the output of the fuel cell. Among the accessories, power consumption of the air compressor used to supply air takes up the greatest proportion.

The matters described as the related art have been provided only for assisting in the understanding for the background of the present invention and should not be considered as corresponding to the related art known to those skilled in the art.

SUMMARY

An object of the present invention is to provide a method for controlling power consumption of an air compressor for supplying air to a fuel cell to be minimal.

According to an exemplary embodiment of the present disclosure, there is provided an air supply control method for a fuel cell including: calculating a revolution per minute (RPM) of a motor of an air compressor; calculating a switching frequency of an inverter of the motor of the air compressor at which power consumption becomes minimal based on the calculated RPM of the motor; and controlling the inverter with the calculated switching frequency.

In the calculating of the RPM of the motor of the air compressor, the RPM of the motor may be measured using a position sensor.

The air supply control method may further include: calculating an air supply pressure condition prior to the calculating of the switching frequency of the inverter, in which in the calculating of the switching frequency of the inverter, the switching frequency of the inverter at which the power consumption becomes minimal may be calculated based on the air supply pressure condition and the RPM of the motor.

In the calculating of the air supply pressure condition, an opening degree of an air control valve may be measured under the air supply pressure condition and used.

In the calculating of the switching frequency of the inverter, the power consumption may be determined by three-phase ripple loss power and switching loss power.

In the calculating of the switching frequency of the inverter, the power consumption may be calculated using a DC voltage and a DC current input to the inverter of the motor of the air compressor.

In the calculating of the switching frequency of the inverter, the power consumption may be calculated using an average value of a predetermined number of measured values.

In the calculating of the switching frequency of the inverter, the switching frequency at which the power consumption becomes minimal may be determined while the switching frequency of the inverter is changed.

According to another exemplary embodiment of the present disclosure, there is provided an air supply control system for a fuel cell, including: a motor RPM calculator, implemented by a first processor, calculating RPM of a motor of an air compressor; a switching frequency calculator, implemented by a second processor, calculating a switching frequency at which power consumption of an inverter connected to the motor of the air compressor becomes minimal based on the RPM of the motor calculated by the motor RPM calculator; and an inverter controller controlling the inverter with the switching frequency calculated by the switching frequency calculator.

The motor RPM calculator may use a position sensor of the motor to measure the RPM of the motor.

The air supply control system may further include: an air supply pressure condition calculator, implemented by a third processor, calculating an air supply pressure condition, in which the switching frequency calculator may calculate the switching frequency at which the power consumption of the inverter becomes minimal based on the calculated RPM of the motor and the air supply pressure condition.

The air supply pressure condition calculator may measure and use an opening degree of an air control valve under the air supply pressure condition.

The switching frequency calculator may determine the power consumption of the inverter based on three-phase ripple loss power and switching loss power.

The switching frequency calculator may calculate the power consumption of the inverter using a DC voltage and a DC current input to the inverter of the motor of the air compressor.

The switching frequency calculator may calculate the power consumption of the inverter using an average value of a predetermined number of measured values.

The switching frequency calculator may determine the switching frequency at which the power consumption becomes minimal while the switching frequency of the inverter is changed.

DETAILED DESCRIPTION

Figure 1:
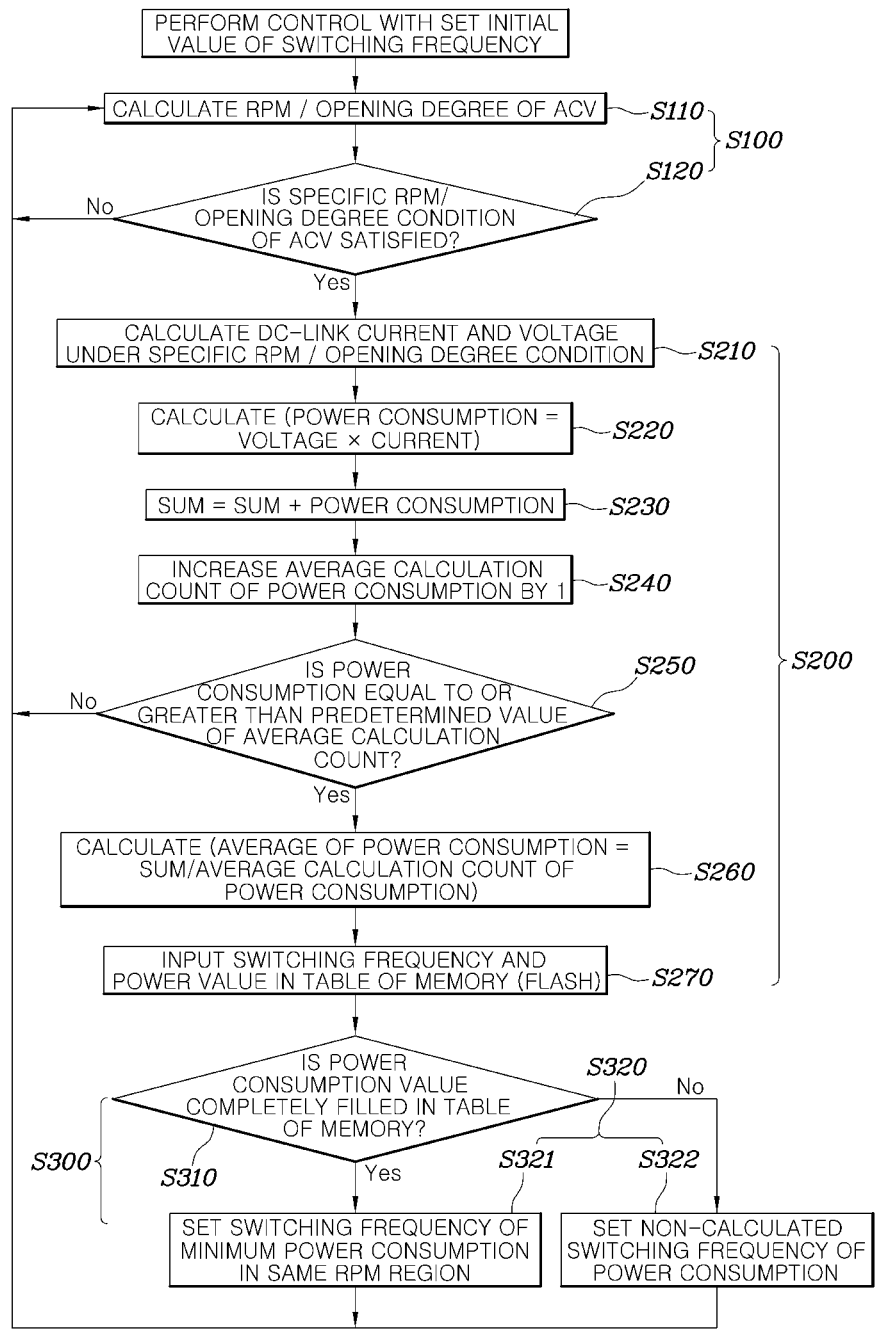
FIG. 1 is a flow chart of an air supply control method for a fuel cell according to an exemplary embodiment of the present disclosure.

Hereinafter, exemplary embodiments of the present disclosure will be described with reference to the accompanying drawings. FIG. 1 is a flow chart of an air supply control method for a fuel cell according to an exemplary embodiment of the present disclosure and FIG. 2 is a configuration diagram of an air supply control system for a fuel cell according to an exemplary embodiment of the present disclosure.

Referring to FIG. 1, an air supply control method for a fuel cell according to an exemplary embodiment of the present disclosure includes: calculating revolution per minute (RPM) of a motor of an air compressor (S100); calculating a switching frequency of an inverter of the motor of the air compressor at which power consumption becomes minimal based on the calculated RPM of the motor (S200); and controlling the inverter with the calculated switching frequency (S300).

According to the air supply control method for a fuel cell, it is possible to improve the efficiency of the air compressor by calculating and controlling the switching frequency at which the power consumption of the inverter is minimized depending on the RPM of the motor of the air compressor.

Figure 2:
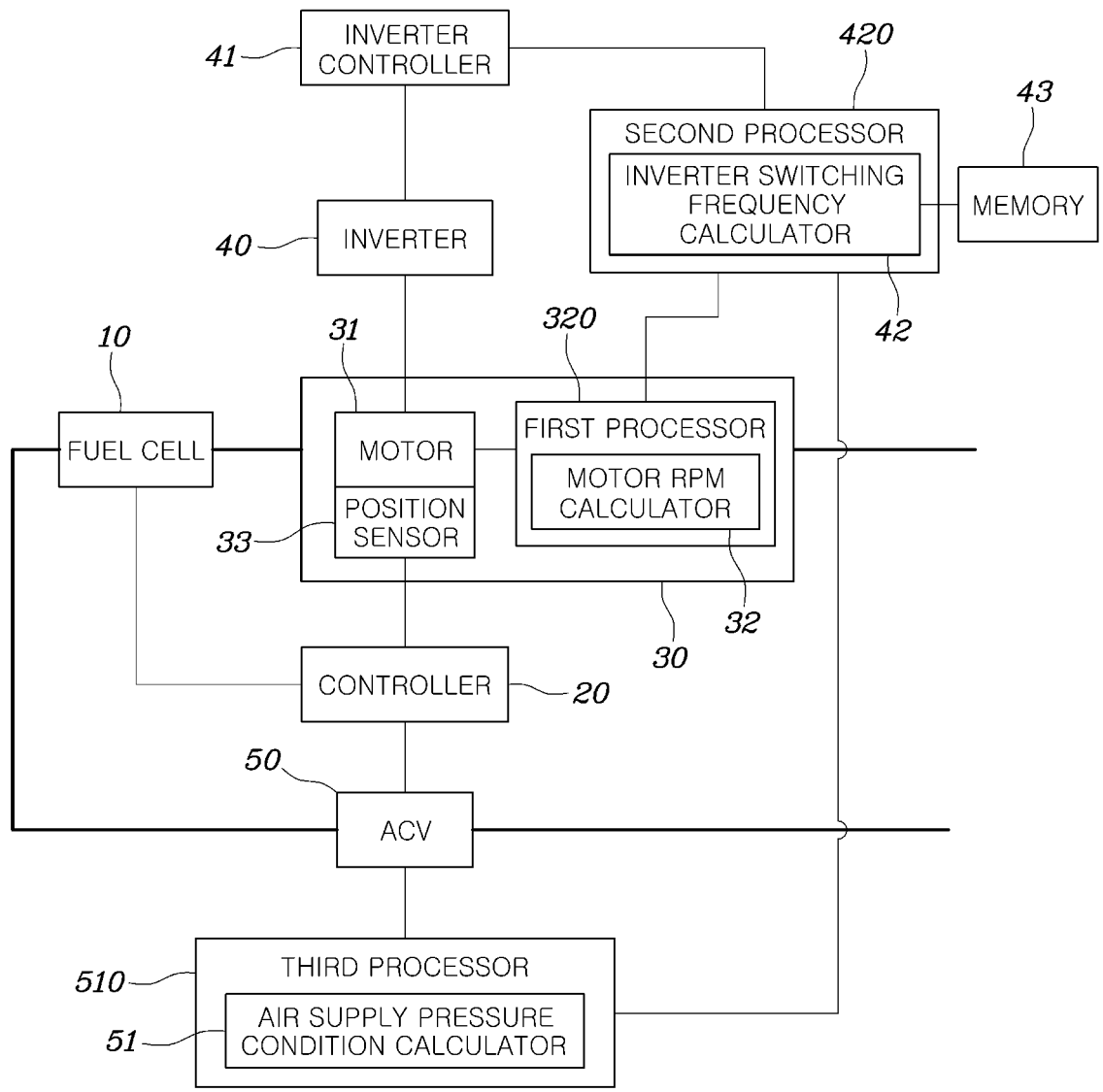
FIG. 2 is a configuration diagram of an air supply control system for a fuel cell according to an exemplary embodiment of the present disclosure.

Referring to FIG. 2, an air supply control system for a fuel cell 10 according to an exemplary embodiment of the present disclosure includes a motor RPM calculator 32, implemented by a first processor 320, for calculating RPM of a motor 31 of an air compressor 30; a switching frequency calculator 42, implemented by a second processor 420, for calculating a switching frequency at which power consumption of an inverter 40 connected to the motor 31 of the air compressor 30 becomes minimal based on the motor RPM calculated by the motor RPM calculator 32; and an inverter controller 41 for controlling the inverter 40 with the switching frequency calculated by the switching frequency calculator 42.

The first and second processor 320 and 420 perform various functions of the motor RPM calculator 32 and the switching frequency calculator 42, respectively. The motor RPM calculator 32 and the switching frequency calculator 42 described below are implemented with software instructions executed on the first and second processor 320 and 420, respectively.

A thick line in FIG. 2 represents an air passage through which air is supplied to and discharged from the fuel cell 10. In one exemplary embodiment, an air control valve (ACV) 50 is disposed at the passage through which the air is introduced and discharged to control an air pressure.

The air supply control method for a fuel cell according to an exemplary embodiment of the present disclosure illustrated in FIG. 1 may be implemented by the air supply control system for a fuel cell of FIG. 2.

Accordingly, referring to FIGS. 1 and 2, a controller 20 controls a power generation of the fuel cell 10 based on a required output, a state of charge of a battery, or the like, and controls the RPM of the motor 31 of the air compressor 30 and an opening degree of the air control valve (ACV) 50.

In the calculating of the RPM of the motor 31 of the air compressor 30 (S100), the motor RPM calculator 32 connected to the motor 31 in the air compressor 30 calculates the RPM of the motor 31.

Specifically, in the calculating of the RPM of the motor 31 of the air compressor 30 (S100), the motor RPM calculator 32 may calculate the RPM of the motor 31 by measuring the RPM of the motor 31 using a position sensor 33 attached to the motor 31 of the air compressor 30.

In the calculating of the switching frequency of the inverter 40 of the motor 31 of the air compressor 30 at which the power consumption becomes minimal based on the calculated RPM of the motor 31 (S200), the switching frequency calculator 42 calculates the switching frequency of the inverter 40 at which the power consumption of the inverter 40 connected to the motor 31 of the air compressor 30 becomes minimal.

Prior to the calculating of the switching frequency of the inverter 40 (S200), in the calculating of the air supply pressure condition (S100), an air supply pressure condition calculator 51, implemented by a third processor 510, may calculate the pressure condition of air supplied to the fuel cell 10 to calculate a load state of the air compressor 30.

The third processor 510 performs various functions of the air supply pressure condition calculator 51. The air supply pressure condition calculator 51 described below is implemented with software instructions executed on the third processor 510.

For example, the measured opening degree of the air control valve (ACV) 50 connected to the fuel cell 10 may be used in the air supply pressure condition.

More specifically, in the calculating of the RPM of the motor 31 of the air compressor 30 and the air supply pressure condition (S100), the motor RPM calculator 32 calculates the RPM of the motor 31 and the air supply pressure condition calculator 51 calculates the opening degree of the air control valve (ACV) 50 (S110) and the air supply control method proceeds to determining whether or not the calculated RPM of the motor 31 and the opening degree of the ACV 50 are a specific motor RPM and an opening degree of the ACV 50 that are stored in a table of a memory 43 (S120) and calculating the switching frequency of the inverter 40 if it is determined that the calculated RPM of the motor 31 and the opening degree of the ACV 50 are the specific motor RPM and the opening degree of the ACV 50 (S200).

In the calculating of the switching frequency of the inverter 40 (S200), the switching frequency calculator 42 calculates the switching frequency of the inverter 40 at which the power consumption becomes minimal under the RPM condition of the motor 31 calculated by the motor RPM calculator 32 and the air supply pressure condition calculated by the air supply pressure condition calculator 51.

In the calculating of the switching frequency of the inverter 40 by the switching frequency calculator 42 (S200), the power consumption may be determined by three-phase ripple loss power and switching loss power. The loss power due to the three-phase ripple current has a dominant effect on the inverter efficiency when the switching frequency of the inverter 40 is low and the switching loss power has a dominant effect on the inverter efficiency when the switching frequency of the inverter 40 is above a certain level. Therefore, the power consumption of the inverter 40 may be determined by the sum of the three-phase ripple loss power and the switching loss power that vary depending on the switching frequency.

In the calculating of the switching frequency of the inverter 40 by the switching frequency calculator 42 (S200), the power consumption may be calculated by using a DC voltage and a DC current input to the inverter 40 of the motor 31 of the air compressor 30 (S210 and S220). Specifically, the direct current (DC) voltage and current input to the inverter 40 of the motor 31 of the air compressor 30 may be sensed (S210) and thus the consumed power may be calculated (consumed power=voltage×current) (S220).

In the calculating of the switching frequency of the inverter 40 by the switching frequency calculator 42 (S200), the power consumption may be calculated using an average value of a predetermined number of measured values (S230, S240, S250, S260, S270) for the power consumption. It is possible to calculate the power consumption of the inverter 40 using the average value of a plurality of measured values due to easy occurrence of noise and error. Here, the predetermined number may be set to 10, for example, or may be set to be greater or less than 10.

Specifically, if a plurality of the calculated power consumption are summed (S230), the number of the calculated power consumption is determined as an average calculation count of the power consumption (S240), and the average calculation count of the power consumption is calculated as many as the predetermined number (S250), the sum of the power consumption is divided by the average calculation count of the power consumption to calculate an average of the power consumption (S260). The switching frequency and the average of the power consumption calculated accordingly are stored in the memory 43 connected to the switching frequency calculator 42 (S270).

In the calculating of the switching frequency of the inverter 40 (S200), when the switching frequency calculator 42 calculates the switching frequency that is the minimum power consumption of the inverter 40, the power consumption is stored in the memory 43 connected to the switching frequency calculator 42 while the switching frequency is changed under the same RPM of the motor 31 and the air supply pressure condition and the switching frequency at which the power consumption stored in the memory 43 becomes minimal may be determined.

In the calculating of the switching frequency of the inverter 40 (S200), the switching frequency calculator 42 calculates the RPM of the motor 31 and the air supply pressure condition, the calculated RPM of the motor 31 is set to be the RPM condition, and the calculated air supply pressure condition is set to be the pressure condition, such that the table of the average power consumption depending on the switching frequency of the inverter 40 may be stored in the memory 43 connected to the switching frequency calculator 42.

Specifically, the RPM of the motor 31 is set to be a finite number of RPMs, the opening degree of the air control valve (ACV) 50 is set to be a finite number of opening degrees under the air supply pressure condition, and the switching frequency of the minimum power consumption is calculated at a finite number of points to which a finite number of RPMs and a finite number of opening degree conditions each correspond, thereby filling the table of the memory 43. It is possible to calculate the switching frequency by a linear interpolation or the like in the section between the finite number of points. For example, the finite number of RPMs may use the table in which the maximum RPM and the minimum RPM of the motor 31 of the air compressor 30 are divided in units of 5000 [rpm] and the finite number of opening degrees of the ACV 50 may use the table in which the maximum opening degree and the minimum opening degree of the ACV 50 are divided in units of 10 [deg].

In the controlling of the inverter 40 with the calculated switching frequency (S300), the inverter controller 41 connected to the inverter 40 controls the inverter 40 to be switched with the switching frequency of the minimum power consumption calculated.

More specifically, in the controlling of the inverter 40 with the calculated switching frequency (S300), it is determined whether the table of the memory 43 connected to the switching frequency calculator 42 in which the average power consumption for each switching frequency of the inverter 40 under the RPM of the motor 31 and the air supply pressure condition is stored is completely filled (S310) and if it is determined that the table is completely filled, the RPM of the motor 31 and the air pressure condition are controlled with the switching frequency of the minimum power consumption (S321) and if it is determined that the table of the average power consumption depending on the switching frequency of the inverter 40 is not completely filled, the inverter 40 is controlled with the non-calculated switching frequency (S322), whereby the table of the average power consumption is completed.

According to the control method and system of the present disclosure, it is possible to improve the efficiency of the fuel cell system by minimizing the power consumption of the air compressor of the fuel cell only using the control technology without adding the separate parts.

Although the present disclosure has been shown and described with respect to specific exemplary embodiments, it will be obvious to those skilled in the art that the present invention may be variously modified and altered without departing from the spirit and scope of the present invention as defined by the following claims.

What is claimed is:

1. An air supply control method for a fuel cell, comprising:
   calculating an air supply pressure and a revolution per minute (RPM) of a motor of an air compressor;
   determining multiple switching frequencies of an inverter of the motor by varying a switching frequency under the calculated RPM of the motor and the calculated air supply pressure;
   determining multiple power consumption values of the inverter corresponding to the multiple switching frequencies, respectively, and storing the determined multiple power consumption values in a memory;
   determining a minimum power consumption value among the multiple power consumption values stored in the memory and determining a control switching frequency corresponding to the minimum power consumption value; and
   controlling the inverter to be switched with the determined control switching frequency.

2. The air supply control method of claim 1, wherein in the calculating of the RPM of the motor of the air compressor, the RPM of the motor is measured using a position sensor.

3. The air supply control method of claim 1, wherein in the calculating of the air supply pressure, an opening degree of an air control valve is measured and used for calculating the air supply pressure.

4. The air supply control method of claim 1, wherein in the determining of the control switching frequency of the inverter, each power consumption value is determined by three-phase ripple loss power and switching loss power.

5. The air supply control method of claim 1, wherein in the determining of the control switching frequency of the inverter, each power consumption value is calculated using a DC voltage and a DC current input to the inverter of the motor of the air compressor.

6. The air supply control method of claim 5, wherein in the determining of the multiple power consumption values of the inverter, each power consumption value is calculated using an average value of a predetermined number of measured values of power consumption of the air compressor.

* * * * *